Patented Feb. 10, 1942

2,272,399

UNITED STATES PATENT OFFICE 2,272,399

RUBBER COMPOUND OR PRODUCT AND METHOD OF MAKING THE SAME

Harold Becher, Jacob Stein, and John Ross, New York, N. Y., assignors, by direct and mesne assignments, to Antiseptics, Inc., New York, N. Y., a corporation of New York No Drawing. Application January 21, 1937, Serial No. 121,559

8 Claims. (Cl. 260—768)

Our invention relates to a new and improved method of making rubber material or rubber products, and it also relates to new and improved rubber material or rubber products. The invention applies to rubber sheeting, and to rubber material made in numerous other forms. It also applies to fabrics and the like which have been rubberized. It also applies to rubber material having different degrees of elasticity or rigidity, so that the invention includes rigid rubber material or rigid rubber products, and it also includes the relatively thin and elastic sheeting which is used for making garments, hospital sheets, and other articles which are intended to come into contact with the skin, or which are intended to be used adjacent the skin, so as to produce a surface antiseptic effect.

While we prefer to use our improved method for making the novel products, the claims for said products are not to be limited to any particular method of making the same.

One of the objects of our invention is to produce rubberized fabrics or rubber material or rubber compounds or rubber products, in which suitable antiseptic materials have been intimately incorporated. Said incorporation of the antiseptic material or of the antiseptic materials in the rubber material, is preferably accomplished by adsorption or by means of absorption.

The invention is not limited to producing a true chemical combination between the rubber and the added antiseptic material or materials.

Another object of our invention is to provide a method which can be carried out cheaply and which is suitable for large scale production.

Another object of our invention is to make rubber which is suitable for making sanitary garments, such as infant's garments, wearing apparel in general, and which is also useful for making crib sheets, bed sheets, hot water bags, surgical goods and other objects in which it is desirable to have a rubber which has marked antiseptic properties or therapeutic properties.

Rubber of this type will retain its antiseptic properties, even if washed repeatedly under ordinary conditions.

This application is a continuation in part of application Serial No. 53,906 filed in the United States Patent Office on December 11, 1935, in the names of Harold Becher, Jacob Stein, and John Ross.

Other objects of our invention will be stated in the following description.

We have discovered that under suitable circumstances, rubber has the properties of a semipermeable membrane to certain suitable antiseptics. These antiseptics may be applied in the solid condition, or they may be dissolved in suitable solvents, said solvents being preferably organic solvents.

We prefer to treat the rubber, preferably in the cured or vulcanized condition, with the antiseptic material, under suitable conditions, so as to avoid changing the color of the rubber and to lessen the cost of operation. However, in certain aspects of the invention, it is not limited to the treatment of vulcanized rubber with the antiseptic, for the purpose of incorporating the antiseptic into the rubber.

Among the materials that may be used to accomplish the object of this invention are antiseptic materials such as, oxyquinoline; amino compounds, for example, rivanol; nitrogen ring heterocyclic compounds, for example, acriflavine; organo metallic compounds, for example, organic mercury compounds or mercurials; certain phenols, for example, p-chlor m-xylenol; and halogenated aromatic acids, for example, chlor-benzoic acid. he oxyquinoline and its derivatives, said amino compounds, and said nitrogen ring heterocyclic compounds are classified as nitrogen ring compounds.

We have found that if a cured or vulcanized rubber container or vessel, which is thin and flexible, is filled with a solution of oxyquinoline in acetone, and said rubber vessel is then immersed in an outer vessel which contains an aqueous solution of ferric chloride, the solution of ferric chloride will be stained green within a few minutes. This proves that the oxyquinoline has passed through the rubber, producing an effect similar to that of osmosis.

We can treat rubber material, either vulcanized or unvulcanized, with a solution of oxyquinoline in acetone. However we prefer to treat the vulcanized or cured rubber in this manner, so as to avoid certain changes which are produced by vulcanization, if the uncured rubber is treated with the oxyquinoline, prior to vulcanization. If the rubber is treated with the oxyquinoline prior to vulcanization, some of the antiseptic reacts with the vulcanizing agent during the vulcanization of the rubber. Such reaction may yield by-products which are undesirable.

For example, if the oxyquinoline is incorporated into the rubber prior to vulcanization, the result is to produce a reaction product of the oxyquinoline with the vulcanizing agent which is in the form of a fine powder, if said vulcanizing agent is sulphur chloride. When the vulcanized rubber material is flexed or otherwise mechanically worked, said powder is released from the rubber, which is undesirable.

However we do not wish to exclude from the invention, the addition of the oxyquinoline to the unvulcanized rubber. Said oxyquinoline may be added to a batch of unvulcanized rubber, either in the form of a solution, or if desired, the solid oxyquinoline can be added to the unvulcanized rubber, and the mixture can then be worked in the usual manner. This working or intermixing produces sufficient heat so as to melt or vaporize the oxyquinoline, so that it is uniformly distributed throughout or dissolved in the unvulcanized rubber. The unvulcanized rubber is then vulcanized in the usual manner, either by the acid or cold cure, by means of the air cure, or by means of steam curing.

Likewise, when the oxyquinoline or other antiseptic is incorporated in the vulcanized rubber, said rubber may have previously been vulcanized according to any of the accepted and well known methods, such as those above enumerated. The rubber material is sufficently dense, when the same has been vulcanized, so as to be substantially impermeable to water or moisture under the ordinary conditions of use.

Instead of treating the vulcanized or unvulcanized rubber with a solution of oxyquinoline in acetone, other solvents may be used. For example, the oxyquinoline can be dissolved in ethylene dichloride, or in methanol, or in a mixture of methanol and water. When the rubber is thus treated according to any of the methods above stated, the rubber will take up the oxyquinoline and the rubber will retain the oxyquinoline tenaciously, while yielding the oxyquinoline with sufficient rapidity so as to produce a substantial surface antiseptic effect. Likewise, by using a proper proportion of oxyquinoline or of the other antiseptics later specified herein, said antiseptic effect will be substantially harmless or non-toxic. That is, when certain antiseptics are introduced in excessive proportion into the body secretions or emissions, the tissue may be injured or a toxic effect may be produced. One of the advantages of our invention is the selection of suitable antiseptics which can be incorporated into rubber or rubber material which is substantially impermeable to water or moisture or to the body emissions under conditions of actual use, said rubber liberating the antiseptic material with sufficient rapidity to the body emissions, so as to produce a substantial surface antiseptic effect, while preventing too great a concentration of the antiseptic in the body emissions, as an excessive concentration of certain antiseptics will either injure the body tissue or produce a toxic effect.

When the oxyquinoline or the antiseptic substance is dissolved in benzene or in an equivalent solvent, the function of said solvent is to cause the rubber or swell, so that the rubber then takes up the oxyquinoline.

If a solution of an antiseptic is used, the rubber material, preferably vulcanized, is treated with the solution of the antiseptic, by dipping, drumming, etc.

When a solution of oxyquinoline is used, the concentration of the oxyquinoline in said solution is preferably from one-half per cent of the oxyquinoline by weight, to five per cent by weight. We can use stronger or weaker solutions of the oxyquinoline, without departing from the scope of the invention. The percentage by weight of the oxyquinoline in the solution may be as low as ½ per cent, and it may be as high as twenty per cent.

Similar solutions or dry oxyquinoline can be added to the uncured rubber in a suitable mill, as previously specified. It is to be noted that oxyquinoline refers generally to a class of derivatives which have a phenolic hydroxy group. The oxyquinoline which is generally used as an antiseptic is 8-oxyquinoline. When oxyquinoline is used in undissolved form, it may be designated as being in the "free" state. If the antiseptic, such as oxyquinoline, is added to the rubber prior to vulcanization, the amount of said added antiseptic should be increased, so as to make allowance for the decomposition of a portion of the antiseptic during the vulcanization.

If the antiseptic is added to the unvulcanized rubber, we prefer to vulcanize the rubber at a suitable low temperature, by means of sulphur chloride or the like.

The vulcanized rubber which is treated according to the invention is preferably in the form of thin and elastic sheet rubber, although we do not wish to limit the invention to any particular type or thickness of rubber. If sheet rubber is treated, its thickness may vary from four-thousandths of an inch to thirty-thousandths of an inch. After the treatment, the rubber retains the original properties of the vulcanized rubber, with reference to elasticity and flexibility, impermeability to air, water, moisture, body emissions, etc.

The rubber which is thus treated, may have the oxyquinoline incorporated therein by means of dipping or drumming or other means, and the weight of the rubber sheeting may be increased by the solution as much as three per cent to five per cent, if a solution of oxyquinoline in acetone is utilized.

Upon standing, the rubber loses some or all of the acetone. After a period of about one hour, the weight of the rubber remains constant, and tests have shown that if a cured rubber sheet is thus treated, the weight of the original cured sheet has been increased by at least one hundredth per cent, thus proving that the rubber retains the oxyquinoline. The weight of the rubber sheet may be increased as much as one per cent, if the rubber is caused to take up the oxyquinoline. The oxyquinoline may be uniformly distributed throughout the mass of the rubber, or it may have a relatively higher concentration adjacent the surface of the rubber material, than in the interior of the rubber material.

Hence, the rubber may be caused to swell by means of a solvent such as acetone or benzene, which preferably does not attack or dissolve the rubber to any substantial extent, and said solvent can be partially or wholly driven off at a low temperature, leaving the antiseptic in the rubber, and without changing any of the essential properties of the vulcanized rubber, such as flexibility or rigidity, elasticity, color or the like.

It is preferable to treat the vulcanized rubber with the antiseptic, because vulcanized rubber sheeting or vulcanized rubber material can be handled more conveniently than unvulcanized rubber material. Likewise it is possible to treat rubber garments such as baby pants and the like, after said rubber garments have been wholly manufactured or after they have been partially manufactured.

When rubber which has been vulcanized is treated according to our method, we prefer to use substantially pure rubber which has been vulcanized by sulphur monochloride, at a vulcanization temperature of about 110° F., but we do not wish to be limited to this example. This rubber may contain pigment, anti-ageing ingredients, etc.

Whenever we refer to oxyquinoline, we also include the derivatives thereof and also include generally antiseptic nitrogen ring compounds, antiseptic amines, organo-metallic compounds and antiseptic phenols. However, the best and preferred antiseptics are oxyquinoline and its derivatives, and the phenyl mercuric nitrate which is later specified herein, as these are remarkably selective for the purposes hereof. Likewise we wish to include the application of these antiseptics to rubber which has been cured or which is to be cured by various methods of curing, including steam curing.

When the oxyquinoline or antiseptic amine or phenolic compound is added to the unvulcanized rubber, and said rubber is subsequently vulcanized by means of a cold or acid cure, using sulphur chloride, we have found that any substantial decomposition of the oxyquinoline or of the amine or of the phenolic compound can be prevented, by adding to the unvulcanized rubber a salt or ester or other suitable derivative of the oxyquinoline or of the amine or of the phenolic compound. For example, we can add to the unvulcanized rubber suitable salts of oxyquinoline, such as the sulphate or the hydrochloride of the oxyquinoline. Likewise we could add the sulphate or hydrochloride of the amine. We can also add the amino-acridines to the unvulcanized rubber, in the form of a sulphate or the hydrochloride salt of the amino-acridine. We can also use the carbethoxy derivatives of various phenols, of catechol, of phenol itself, of thymol and the like. These salts or other compounds or esters are leachable from the rubber. Hence if these salts or other compounds or esters are incorporated in the rubber prior to vulcanization, and the rubber is then cured with sulphur chloride, said salts or other compounds or esters can be leached from the rubber by the body emissions, even though the rubber is of the type which is substantially impermeable to water and moisture. Since some of the previously mentioned salts or derivatives or esters impart a surface antiseptic action to the rubber, and others do not, it is desirable in many cases, to liberate the oxyquinoline or the amine or phenol from the previously mentioned compounds. For example, after the rubber has been vulcanized with sulphur chloride, said vulcanized rubber can be exposed to the fumes of ammonia or to aqueous or liquid ammonia, and this will liberate the oxyquinoline from the salts previously mentioned. Said treatment with the fumes of ammonia, will also liberate the other active antiseptic substances, from the previously mentioned salts or compounds or esters.

The rubber which has thus absorbed or adsorbed the oxyquinoline or the other substances mentioned herein, will retain the same for a substantial period, even if the rubber is treated with boiling water and with weak solutions of alkalies, in the ordinary cleansing of the rubber. Likewise the rubber will resist the complete rapid removal of the oxyquinoline or the like, even if the rubber is treated with acids normally found in human emissions. The rubber also retains its antiseptic properties under normal washing conditions with water.

Tests have shown that rubber which has been thus treated will inhibit the growth of *Staphylococcus aureus* or other organisms.

For the purpose of determining the antiseptic effect, it may be stated that rubber has a surface antiseptic effect, according to this invention, if it will either destroy or inhibit the growth of *Staphylococcus aureus*, which may be considered as being a test organism.

In order to give a practical example of the invention, without being limited to the details thereof, six hundred pounds of cured sheet rubber may be drummed with one hundred pounds of saw dust, which have been wetted with ten liters of a solution of oxyquinoline in acetone. This solution may contain from one half per cent to five per cent of oxyquinoline by weight, or even as high as twenty per cent. For practical purposes the percentage (by weight) of the oxyquinoline may be ¼% of the rubber, in the completed commercial article.

Said drumming may be carried out at ordinary room temperature of about 70° F., for about 45–60 minutes, and after the drumming has been completed, the rubber is shaken free from the sawdust at said temperature of about 70° F.

The rubber will then have uniformly taken up the oxyquinoline.

Whenever we refer to oxyquinoline, we also wish to include the derivatives thereof, and we also include generally, antiseptic nitrogen ring compounds, such as acriflavine, rivanol, thiazines, oxazines, isoquinolines.

For example, and in order to avoid being limited to the specific substances mentioned herein, in addition to utilizing the salts of oxyquinoline, we can also utilize 6-ethyl-8-oxyquinoline, or we may use 5-chlor-8-oxyquinoline or 5-brom-8-oxyquinoline or acriflavine or a thiazine, such as tetramethyl-diaminophen-thiazine, or derivatives of compounds heretofore mentioned.

Likewise the vulcanized rubber can be treated, as for example by means of dipping or drumming, so as to cause the rubber to take up a suitable phenol from a solution thereof. As examples of phenols or phenol derivatives, we refer to cresophan, to p-chlor-m-xylenol or the like. We also include within the scope of the invention organo-metallic compounds such as phenyl mercuric nitrate and the like. As examples of other organic mercuric compounds, we refer to phenyl mercuric acetate, to tolyl mercuric hydroxide, and to aniline-mercuric-hydroxide. The last-mentioned compound is sometimes referred to as anilino-mercury-hydroxide. We include suitable organo-metallic compounds generally within our invention, including organic salts of tin and bismuth.

Likewise, we do not wish to be limited to organic mercury compounds. These organo-metallic compounds are preferably dissolved in suitable solvents, such as acetone and the rubber, preferably vulcanized, is treated with said solution.

Likewise, we wish to include halogenated aromatic acids such as chlor-benzoic acid or chlor-salicylic acid, and chlorinated benzenes.

Some of the antiseptics specified herein such as oxyquinoline, can also be mixed in the dry condition with a suitable dry solid carrier, such as starch and the vulcanized rubber can be tumbled with said mixture, at ordinary room temperature of about 70° F., to take up the antiseptic, without taking up the starch.

Likewise, the vulcanized rubber can be caused to take up mixtures of two or more of the above mentioned antiseptics. For example the vulcanized rubber can be caused to take up a mixture of a suitable phenol or a derivative of a phenol, together with oxyquinoline or a derivative thereof.

For example, the rubber can be treated with an acetone solution which contains one-half per cent of oxyquinoline by weight and one-half per cent by weight of p-chlor-m-xylenol.

Whenever we refer to the treatment of rubber, we wish to include the treatment of a substantially pure rubber, and we also wish to include the treatment of rubber sheeting or rubber material which has been compounded with suitable ingredients. For example, when rubber is vulcanized by steam curing, zinc oxide is almost always incorporated into the rubber, and our invention includes the treatment of rubber, vulcanized or unvulcanized, which contains zinc oxide. Likewise the rubber may have incorporated therein, an alkali, or an alkaline earth salt, such as calcium carbonate or magnesium carbonate, or a suitable base. Such compounding ingredients may be masticated with the uncured rubber. The unvulcanized batch can then be treated by means of the adsorption process, although we prefer first to cure the rubber and then to cause the rubber to take up the antiseptic.

If acid-neutralizing substances are incorporated into the rubber, such as calcium carbonate or magnesium carbonate, said neutralizing substances may comprise from one-half per cent to ten per cent of the weight of the rubber.

A rubber product which is thus manufactured neutralizes the acids which are found in perspiration and in other body secretions, while inhibiting the growth of bacteria and putrefaction.

Likewise a jelly may be made which incorporates some of the antiseptic substances above mentioned, such as oxyquinoline, and said jelly can be spread upon the thin sheets of rubber (preferably vulcanized) so as to cause the rubber to take up the antiseptic. Said jelly may be made by adding gelatin to any of the previously mentioned solutions.

Likewise sand or sawdust which has been wetted with any of the above mentioned solutions, can be spread upon the rubber.

Likewise a porous carrier such as cloth, can be saturated with a suitable solution of the oxyquinoline or other antiseptic, and the sheet rubber can be rolled with said saturated and porous carrier.

The method can also be utilized in manufacturing rubber tiles, toilet seats, bath mats, surgical goods, adhesive tapes, or other articles in which a surface antiseptic effect is desired.

The rubber bodies may be of substantial thickness when rubber floor tiles or rubber mats are treated. In such case, the antiseptic is relatively concentrated adjacent the free surface of the rubber article.

Tests have shown that after a sheet of rubber has been treated according to the method stated herein, the surface of the rubber can be removed by scraping or the like, and the freshly exposed surface of the rubber then exhibits surface antiseptic properties.

By treating a thin sheet of vulcanized rubber, the antiseptic material can be uniformly distributed throughout the entire mass of the vulcanized rubber sheeting. It is to be understood that whenever we refer to a specific substance or substances, said substance or substances are stated as being illustrative of the general class or classes to which such substance or substances belong.

Whenever we refer to rubber in the specification herein, we wish to include the treatment of substances similar to rubber and the treatment of rubber substitutes, including synthetic rubber.

If a steam cured rubber is made which includes zinc oxide, and the vulcanized rubber is then treated with oxyquinoline (for example) the oxyquinoline is concentrated relatively adjacent the exposed or free surface of the steam cured rubber, so that the concentration of the oxyquinoline or other antiseptic is less in the interior of the rubber than adjacent the exposed surface of the rubber. The oxyquinoline can be detected by the yellow coloration which it causes. If the steam cured rubber has been treated subsequent to vulcanization, the yellow coloration of the steam cured rubber is confined to the surface thereof. If the oxyquinoline has been added to the rubber prior to vulcanization, and the rubber is then vulcanized by steam curing, said yellow coloration is diffused quite uniformly throughout the entire mass of the steam cured rubber. This provides a test for determining whether the oxyquinoline has been added to the rubber prior to the vulcanization or subsequent to vulcanization. A much superior product is secured if the oxyquinoline is incorporated in the rubber without reacting the oxyquinoline with the vulcanizing agent of the rubber. The reaction product between the oxyquinoline and the vulcanizing agent forms a powder. A major part of this powder can be removed from the rubber by means of vigorous stretching and working. Such vigorous stretching and working seriously weakens the rubber and lowers its effective life. Likewise some of the reaction product remains in the rubber in occluded form, which cannot be removed even by vigorous stretching and mechanical working.

In order to produce rubber which has a surface antiseptic action which is substantially nontoxic and which will not injure the tissue, a number of factors are involved.

First, the rubber must take up the antiseptic without chemical or physical action which will destroy the antiseptic. However, by adding certain antiseptics in sufficient proportion to unvulcanized rubber, and under proper conditions, enough antiseptic will remain in the vulcanized rubber so as to produce a surface antiseptic action.

Likewise, when the antiseptic vulcanized rubber is caused to contact with water, and in particular with the aqueous body emissions, the water must be able to take up the antiseptic from the rubber with sufficient rapidity and in sufficient concentration, and the antiseptic must have sufficient strength when it is taken up by the body emissions from the rubber, in order to produce a practical antiseptic action upon bacteria.

For example, under a standard test which is prescribed under the Federal pure food and drug act, an antiseptic salve is defined as being a salve which will inhibit the growth of *Staphylococcus aureus* to a depth of three millimeters when such antiseptic salve is placed within a recess of an agar culture of such bacteria, and such inhibition is produced within forty-eight hours.

The rubber must contain the antiseptic in sufficient quantity or concentration. Otherwise the rubber cannot deliver the antiseptic to the body emission in sufficient quantity or concentration.

Likewise the partition coefficient of the rubber and water system must be such as to allow the water (body emission) to take up a sufficient percentage of the antiseptic from the rubber.

Also, the antiseptic must have a sufficiently high phenol coefficient so that when the body emission does not take up more antiseptic from the rubber, the body emission has a sufficient proportion of the antiseptic, to produce the desired antiseptic action.

When rubber is caused to take up oxyquinoline (for example) as stated herein, the rubber produces the previously mentioned designated antiseptic effect in one hour and even less, instead of requiring the period of forty-eight hours which has previously been mentioned.

Many substances which have powerful germicidal or antiseptic properties per se, lose said properties for all practical purposes when such substances are incorporated into the rubber, because the preceding essential factors are not properly correlated.

When rubber which contains an antiseptic according to this invention, is caused to contact with water or with an aqueous body emission, the antiseptic diffuses from the rubber into the body emission, and said antiseptic is either dissolved or taken up in some manner by the body emission, until a condition of equilibrium is secured, when the body emission does not take up any more antiseptic from the rubber. Under this condition of equilibrium, the concentration of the antiseptic in the water has a certain ratio, which is definite for each antiseptic, relative to the concentration of the remaining antiseptic in the rubber. Under certain conditions the antiseptic may be dissolved in the water of the body emission. Under other conditions the antiseptic is present in the body emission, in the form of a fine dispersion, since certain effective antiseptics are only very slightly soluble in water. However the solution of the antiseptic in the body emission, or the dispersion of the antiseptic from the rubber into the body emission, can be tested by the action upon bacteria.

The ratio between the antiseptic which remains in the rubber, and the antiseptic which is taken up by the body emission, is designated as the partition coefficient of the antiseptic in the rubber-water system as follows:

$$\frac{\text{Concentration of the antiseptic in water}}{\text{Concentration of the antiseptic in rubber}} = K$$

In the case of oxyquinoline, K equals 1/38.

The surface antiseptic potency of the rubber, depends upon the phenol coefficient of the antiseptic in aqueous solution, and it also depends on the concentration of the antiseptic in the rubber, and it also depends upon the rapidity with which such equilibrium is secured. That is, the rate at which the antiseptic diffuses from the rubber into the body emission or into water, depends in part upon the concentration of the antiseptic in the rubber.

In order to determine the phenol coefficient of an antiseptic, a measured quantity of a solution of the antiseptic with a predetermined concentration is put into a standard broth culture of test bacteria, according to the standard test of the Federal Pure Food and Drug Administration. The potency of the antiseptic is measured by the concentration of said antiseptic which is required to kill the test bacteria in the same time as a standard solution of phenol.

If it is assumed that M grams of antiseptic per cc. of water are necessary to kill or to inhibit the growth of said bacteria (*Staphylococcus aureus*) in one hour, then $$\frac{M}{\text{Concentration of the antiseptic in water}}$$

must equal 1, or be less than 1.

Hence, in order to kill or to inhibit the growth of a standard culture, the main factors which are involved are the partition coefficient, the concentration of the antiseptic in the rubber, and the time which is required to reach the equilibrium above mentioned.

Oxyquinoline is particularly advantageous because it reaches the condition of equilibrium very rapidly, and its partition coefficient permits a sufficient concentration of the oxyquinoline to enter the body emission.

An antiseptic action takes place with oxyquinoline and with the other antiseptics specified herein, even before equilibrium is reached.

Tests have shown that due to the proper correlation of the essential factors, rubber which contains at least one hundredth per cent of oxyquinoline has an antiseptic action which is far superior to that stated, for example, in U. S. Patent No. 2,023,253.

Tests have shown that the oxyquinoline has the unique and special and remarkable affinity for vulcanized rubber. When vulcanized rubber is caused to contact with solid oxyquinoline, the vulcanized rubber can rapidly take up the solid oxyquinoline. This rubber may be a substantially pure rubber sheeting.

The rubber material which is specified herein is sufficiently dense so that it is substantially impermeable for all practical purposes to the body emissions, so that the antiseptic cannot be removed from the rubber to any substantial extent, by the physical penetration of the body emission into the rubber. For best results, the antiseptic should be contained in the rubber in the form of a solid solution, and the antiseptic must be of the type which can diffuse from one part of the rubber material to another part thereof, if there are different concentrations of the antiseptic in different parts of the rubber, and the rubber material must be of the type which will permit said diffusion.

If the rubber material is substantially pure, or if proper compounding ingredients are added to the rubber material prior to vulcanization, said condition of diffusion can be secured.

Tests have shown that when a body emission is caused to contact with the surface of rubber which has been treated according to this invention, the oxyquinoline is taken up very rapidly at the beginning by the body emission from the rubber. A condition of equilibrium is secured when the body emission has taken up to 2½ per cent of the oxyquinoline in the rubber, to the limit of the solubility of the oxyquinoline in the emission, which is controlled by the acidity of the emission.

The addition of the antiseptic to the rubber, prior to vulcanization, can be detected by a color effect, or by other effects due to the formation of reaction products of the antiseptic with the vulcanizing agent.

We believe that when the free surface of the vulcanized rubber sheet contacts with an aqueous body emission, the emission either swells the free surface, or penetrates said free surface slightly. Said swelling or penetration establishes the rubber-water phase. Since the antiseptic, in dry and solid form can be taken up by the dry and solid vulcanized rubber, it is clear that the antiseptic can travel through the rubber.

Hence, by establishing the rubber-water phase, the antiseptic can be taken up by the body emission from the rubber. The rubber should be free from an excess of added ingredients which would prevent the release of the antiseptic from the rubber. Hence we prefer to use thin and elastic rubber sheeting, which consists essentially of pure rubber, containing an antiseptic, or also a suitable leachable base.

Another valuable and identifying feature of the invention is that the antiseptic is of sufficient potency and of sufficient concentration in the rubber, to produce an antiseptic effect in the body emission, even before the body emission has taken up the maximum amount of antiseptic which is determined by its concentration in the rubber and the partition coefficient. This ensures rapid antiseptic action, especially if a rubber garment is worn for a short period.

On the other hand, no toxic effect is produced even when the emission has taken up the maximum amount of antiseptic, as this is controlled by the concentration of the antiseptic in the rubber and the partition coefficient.

Whenever we refer to any substance herein, we also wish to include the esters or salts of those substances which can form esters or salts, and from which the antiseptic can be liberated within the rubber, if said esters or salts are not antiseptic per se. For example, the invention includes carbethoxy phenols, phenolic esters, salts of nitrogen compounds or acetylated or benzoylated nitrogen compounds, and metallic salts of phenols and amides. The invention also includes substances and types of substances which are analogous to and which include chaulmoogra oil, and the esters and derivatives thereof.

Likewise certain substances such as tin salts may be milled into the unvulcanized rubber which can substantially be vulcanized either by acid cure or the like. As examples of tin salts or compounds, we refer to stannous hydroxide and stannic hydroxide. Likewise stannous chloride and stannic chloride can be milled into the unvulcanized rubber. When these substances are milled into the unvulcanized rubber, said substances can be in the dry and undissolved condition.

If desired, boric acid could be milled into the rubber in the proportion of about 3% by weight, the rubber could be vulcanized, and the vulcanized rubber can then be treated with oxyquinoline or the other substances mentioned before, in the manner previously described. Rubber made in accordance to this formula has a soothing effect upon the body tissues.

Likewise rubber which has been treated with boric acid, is more resistant to ordinary washing than the antiseptic rubbers previously mentioned, and which have been made without the use of boric acid. Thus the rubber which contains both boric acid and oxyquinoline, is more resistant to washing than rubber which contains oxyquinoline without containing the boric acid.

If the tin salts or compounds previously mentioned are added to the rubber, they can be present in the proportion of about ½ per cent to four per cent. Rubber which contains said tin salts or compounds shows a surface therapeutic or antiseptic action, against *Staphylococcus aureus*.

Salicylic acid and benzoic acid can be milled into the unvulcanized rubber, to perform the same function as the boric acid. In addition, halogen derivatives, such as chlor-benzoic acid can be milled into the unvulcanized rubber to perform the same function as the boric acid.

It will be noted that by following the examples previously given, the desirable essential physical properties of the rubber are substantially the same, and even better, than rubber which has not been given the desired antiseptic or other properties. That is, rubber sheeting which is made according to this invention, has the desirable elastic property of ordinary rubber sheeting, so that the improved material can be used for making garments and for other purposes where said desirable property must be preserved. This applies also to that part of the invention which relates to the manufacture of the improved rubber material by introducing a substance or substances therein, prior to vulcanization.

It will be noted that many substances specified herein, if added to the rubber prior to the vulcanization thereof, do not interfere with the rate of subsequent vulcanization or with the satisfactory subsequent vulcanization, if sulphur chloride is used as the vulcanizing agent. That is, we refer particularly to salts or compounds, and we also refer to the protected or stable compounds of oxyquinoline and analogous substances, which are not decomposed during the subsequent vulcanization with sulphur chloride. Hence, the rubber materials specified herein, to which the selected materials are added prior to vulcanization, can be vulcanized with the use of ordinary sulphur chloride in a period of about 45 minutes, which is exactly the same as the vulcanization period for ordinary rubber which does not have the antiseptic ingredients added thereto.

Whenever we refer to vulcanized rubber in the claims, we include material which is coated with said rubber or which is impregnated with said rubber.

When we refer to the non-toxic effect of the improved material in the claims, a material which may exert a local irritant effect on the tissue is to be considered non-toxic.

The advantage of using boric acid or other weak and non-irritating acid, in combination with a basic antiseptic (such as oxyquinoline) is that a granulating effect is produced upon a wound or fissure in the skin. Likewise, when such rubber material is caused to contact with a boil, the boil either opens, or the pus resorbs.

We believe that this granulation effect results from a probable ionization of the oxyquinoline.

When we refer, in a claim or claims, to the step of incorporating the oxyquinoline or the like into vulcanized rubber in such manner as to prevent any substantial reaction between the antiseptic and the vulcanizing agent of the rubber, we include the two embodiments of such step which are stated herein. In one such embodiment, the antiseptic is incorporated into the rubber after the rubber has been vulcanized, so that the vulcanizing ingredient has reacted with rubber, before the antiseptic is incorporated. In the other embodiment, the antiseptic is added to the unvulcanized rubber, in the form of a compound of said antiseptic which is inert to the vulcanizing ingredient, and while the vulcanizing ingredient is in the free state. The rubber is then vulcanized and the antiseptic is subsequently liberated from said inert compound thereof. Whenever we refer to an antiseptic effect in the claims, we include a therapeutic effect.

We claim:

1. In the art of making vulcanized rubber for use in contact with body emissions and which contains an antiseptic which is releasable from said vulcanized rubber to produce an antiseptic and non-toxic effect when said vulcanized rubber contacts with body emissions, that step which consists in incorporating said antiseptic into the rubber subsequent to the vulcanization of the rubber and in suitable proportion to produce said effect.

2. In the art of making vulcanized rubber for use in contact with body emissions and which contains an antiseptic which is releasable from said vulcanized rubber to produce an antiseptic and non-toxic effect when said vulcanized rubber contacts with body emissions, those steps which consist in adding to the unvulcanized rubber a compound of said antiseptic which is inert to the vulcanizing agent during vulcanization, vulcanizing the rubber, and subsequently releasing said antiseptic in effective form and proportion from the compound thereof, and in the vulcanized rubber, to produce said effect.

3. In the art of making vulcanized rubber for use in contact with body emissions and which contains an antiseptic which is releasable from said vulcanized rubber to produce an antiseptic and non-toxic effect when said vulcanized rubber contacts with body emissions, those steps which consist in adding to the unvulcanized rubber a compound of said antiseptic which is inert to the vulcanizing agent during vulcanization, vulcanizing the rubber, and subsequently releasing said antiseptic in effective form and proportion from the compound thereof, and in the vulcanized rubber, to produce said effect, said compound being selected from a class which consists of salts and esters.

4. Vulcanized rubber for use in contact with body emissions and which contains an antiseptic which is releasable from said vulcanized rubber when said vulcanized rubber contacts with body emissions, said rubber containing said antiseptic in a proportion suitable to produce an antiseptic and non-toxic effect, said antiseptic being capable of reacting with the vulcanizing agent with which the rubber has been vulcanized, said vulcanized rubber being substantially free from occluded reaction-product of said antiseptic and said vulcanizing agent.

5. A product according to claim 4, in which the antiseptic is selected from a class which consists of nitrogen ring compounds.

6. Vulcanized rubber for use in contact with body emissions and which contains an antiseptic which is releasable from said vulcanized rubber when said vulcanized rubber contacts with body emissions, said rubber having a free surface, said rubber containing said antiseptic in a proportion suitable to produce an antiseptic and non-toxic effect at its free surface, the concentration of said antiseptic in said rubber being greatest adjacent said free surface.

7. An article according to claim 6, in which the rubber contains zinc oxide.

8. In the art of making vulcanized rubber for use in contact with body emissions and which contains an antiseptic capable of reacting with the vulcanizing ingredient of the rubber when said vulcanizing ingredient is in a free state and which is releasable from said vulcanized rubber to produce an antiseptic and non-toxic effect when said vulcanized rubber contacts with body emissions, that step which consists in incorporating said antiseptic in the rubber in such proportions as to produce said antiseptic and non-toxic effect and in such manner as to prevent any substantial reaction between the vulcanizing ingredient and the antiseptic.

HAROLD BECHER.
JACOB STEIN.
JOHN ROSS.